(12) United States Patent
Kelly

(10) Patent No.: US 12,449,120 B2
(45) Date of Patent: Oct. 21, 2025

(54) CUSTOMIZED VANITY ILLUMINATION APPARATUS

(71) Applicant: John Edward Kelly, Hanover, PA (US)

(72) Inventor: John Edward Kelly, Hanover, PA (US)

(*) Notice: Subject to any disclaimer, the term of this patent is extended or adjusted under 35 U.S.C. 154(b) by 65 days.

(21) Appl. No.: 18/445,554

(22) Filed: Oct. 13, 2023

(65) Prior Publication Data

US 2025/0305671 A1   Oct. 2, 2025

(51) Int. Cl.
*F21V 33/00* (2006.01)
*F21Y 115/10* (2016.01)

(52) U.S. Cl.
CPC ....... *F21V 33/0012* (2013.01); *F21Y 2115/10* (2016.08)

(58) Field of Classification Search
CPC .......................... F21V 33/0012; F21Y 2115/10
See application file for complete search history.

(56) References Cited

U.S. PATENT DOCUMENTS

| | | | |
|---|---|---|---|
| 5,362,322 A | 11/1994 | Johansen et al. | |
| 6,442,905 B1 | 9/2002 | Weinstein | |
| 7,183,338 B1 | 2/2007 | Warren | |
| 7,549,784 B1 | 6/2009 | Teeters | |
| 7,607,793 B2 | 10/2009 | Coushaine et al. | |
| 7,654,717 B2 | 2/2010 | Trujillo | |
| 7,753,577 B2 | 7/2010 | Teeters | |
| 8,092,034 B2 | 1/2012 | Zarian et al. | |
| 8,263,694 B1 | 9/2012 | Warren et al. | |
| 8,356,909 B2 | 1/2013 | Verjans et al. | |
| 9,131,560 B2* | 9/2015 | Williams | H05B 45/37 |
| 10,101,521 B1* | 10/2018 | Burgio, Jr. | G02B 6/0061 |
| 10,215,911 B2 | 2/2019 | Myers | |
| 11,555,609 B1* | 1/2023 | Irons | G02B 6/0035 |
| 2013/0299856 A1* | 11/2013 | Verger | B32B 17/10541 438/27 |
| 2014/0313774 A1* | 10/2014 | Myers | G02B 6/0085 362/249.02 |

* cited by examiner

*Primary Examiner* — Evan P Dzierzynski
(74) *Attorney, Agent, or Firm* — John Richardson

(57) ABSTRACT

The invention provides a unique and totally novel apparatus means for illuminating a variety of cabinet working countertops by means of employing a multi layered illumination assembly in a low cost, simple, and effected manner, that is disclosed using conventional materials, an a variety of light illuminations sources, to create an attractive illuminated vanity cabinet accommodating multiple vanity designs.

15 Claims, 4 Drawing Sheets

CUSTOMIZED VANITY ILLUMINATION APPARATUS

CROSS-REFERENCE TO RELATED TOPICS

Provisional Patent Application Filed Aug. 15, 2022 and Provisional Patent No. 63/474,405.

STATEMENT REGARDING FEDERALLY SPONSORED RESEARCH OR DEVELOPMENT

Not applicable.

REFERENCE TO SEQUENCE LISTING IN A TABLE, OR A COMPUTER PROGRAM LISTING COMPACT DISK APPENDIX

Not applicable.

BACKGROUND OF THE INVENTION

The present novel invention generally relates to an apparatus that provides an easy means for illuminating cabinet countertops of for example, bathroom vanities.

There is a significant need for a simple means that is inexpensive and easy to construct for illuminating bathroom vanity or similar cabinets countertops.

Currently available cabinet countertops that are provided with illuminating features are complex, costly and require specialized construction features.

The inventive concept herein is inexpensive and does not require specialized construction features.

DESCRIPTION OF THE RELATED PRIOR ART

Existing US Patents prior art examples, as disclosed in Independent Disclosure Form attached hereto, include U.S. Pat. No. 5,362,322—Johansen Kr et al, U.S. Pat. No. 6,442,905=Weinstein, U.S. Pat. No. 7,183,338—Warren, U.S. Pat. No. 7,549,784—Teeters, U.S. Pat. No. 7,607,793—Coushaine et al, U.S. Pat. No. 7,654,717—Trujillo, U.S. Pat. No. 7,753,577—Teeters, U.S. Pat. No. 8,092,034—Zarian et al, U.S. Pat. No. 8,263,694—Warren e al, U.S. Pat. Nos. 8,356,909, and 10,215,911—Myers.

The aforementioned prior art apparatus all involve complex construction features to achieve the intended purpose of cabinet countertop illumination.

To address the particular limitations in the prior art, the instant invention provides a novel arrangement in the form of a minimal design providing high quality, simple, low cost, and readily deployable means for illuminating a variety of cabinet countertops.

BRIEF SUMMARY OF THE INVENTION

This instant novel invention provides a means for illuminating tiled cabinet countertops for a variety of applications, such as but not limited to, bathroom vanities, kitchen cabinets and workshop countertops.

The essence of the instant invention is to meet the basic requirements of providing simple cabinet countertop illumination is disclosed in the following:
1. The fundamental purpose of the invention is to fill the need for a highly functional and simple means of surface illumination.
2. The invention provides for the use of t that can be applied to any type of tiling.
3. The invention incorporates the positioning of a variety of types of portable direct current light sources positioned within the cabinet under countertop areas that facilitates the transmission of light to the working countertop surfaces through the transparent, translucent epoxy resin.
4. Further, the invention incorporates the positioning of fixed alternating current light sources positioned within the cabinet under countertop areas that facilitates the transmission of light to the working countertop surfaces through an layered illumination assembly apparatus.
5. Further, the inventive concept can be applied to any type of cabinet countertop tiling system.
6. Still further, the inventive concept can applied to a plurality of materials comprising a layered illumination assembly that have the property of transmission of light.
7. Further still, the instant invention can be applied to a variety of cabinet configurations and basin shapes and configurations that employ tiled countertops.

The various disclosed embodiments of the instant invention demonstrate the following significant user advantages over existing prior art:
- There is no requirement of specialized and complex cabinet and tile construction features.
- There are no prior examples that disclose the simplicity and the low cost features of the instant invention to provide cabinet countertop working surface illumination.
- In the prior art examination disclosures show the requirement of specific costly and complex construction features to achieve countertop work surface illumination.
- In a still further feature of the instant invention, there are a plurality of vanity cabinet applications with tiled working surfaces and plurality of basin locations, shapes and configurations to which the instant invention can be applied.
- basin locations, shapes and configurations to which the instant invention can be applied.
- In addition a the instant invention can be applied to a variety of vanity cabinet sink configurations.
- further advantageous feature of the instant invention is that the light source element can be incorporated in the form of a plurality of forms including direct current and alternating current energy supplies.

BRIEF DESCRIPTION OF THE DRAWINGS

Various features, aspects, and advantages of the present invention will become apparent with reference to the following FIGS. 1 to 3.

FIGS. 1 to 3 shows specific components of the composite multi-layer assembly 7 that is the essential novel feature of the instant invention that facilitates light transmission to illuminate the vanity cabinet working countertop 1, comprising a top epoxy or equivalent painted layer 9, a glass tile or equivalent translucent material layer 11, an upper plexi-glass or equivalent material layer 13, a top frame layer constructed in aluminum or equivalent material 15, a lower plexi-glass or equivalent material layer 17, resting on the bottom frame layer constructed in aluminum or equivalent material 19.

FIGS. 1 to 3 show a further view of the cabinet application disclosing the means off the shelf screwed fittings and screwed bolts 21, and J bolts for supporting assembly integral wiring connections, 23.

FIGS. 1 to 3 shows a view of a fixed or portable LED (light emitting diodes) source, or equivalent illuminating light source 25 reduced to practice and located within the cabinet lower compartment.

LIST OF REFERENCE NUMBERS FOR THE ELEMENTS IN THE DRAWINGS

Figure 1:
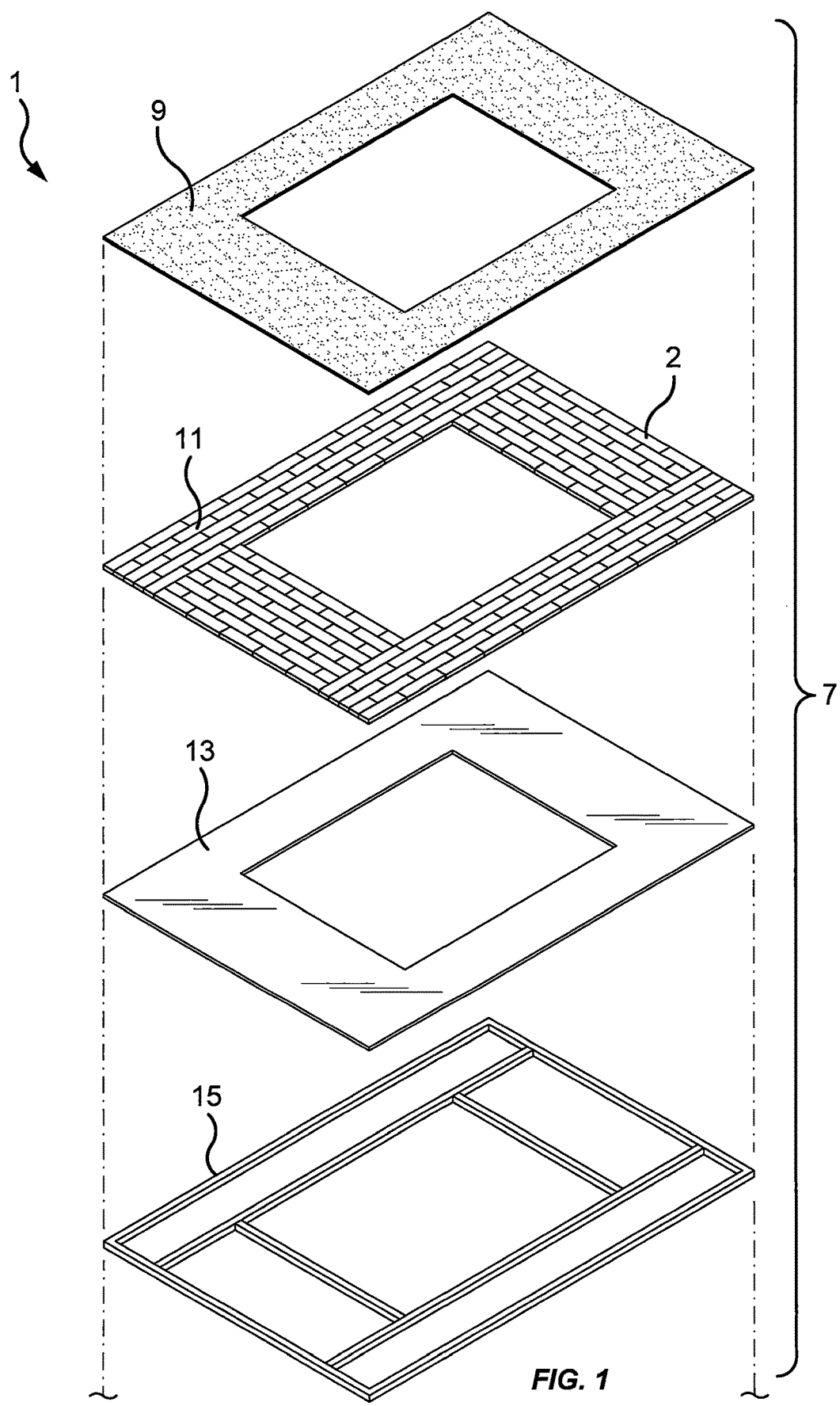
FIG. 1 shows a typical view of the inventive concept applied to a bathroom vanity cabinet 1 with working countertop 2 with a tiled surface showing specifically outer and inner PVC supporting frames 3 and 5.
Figure 1:
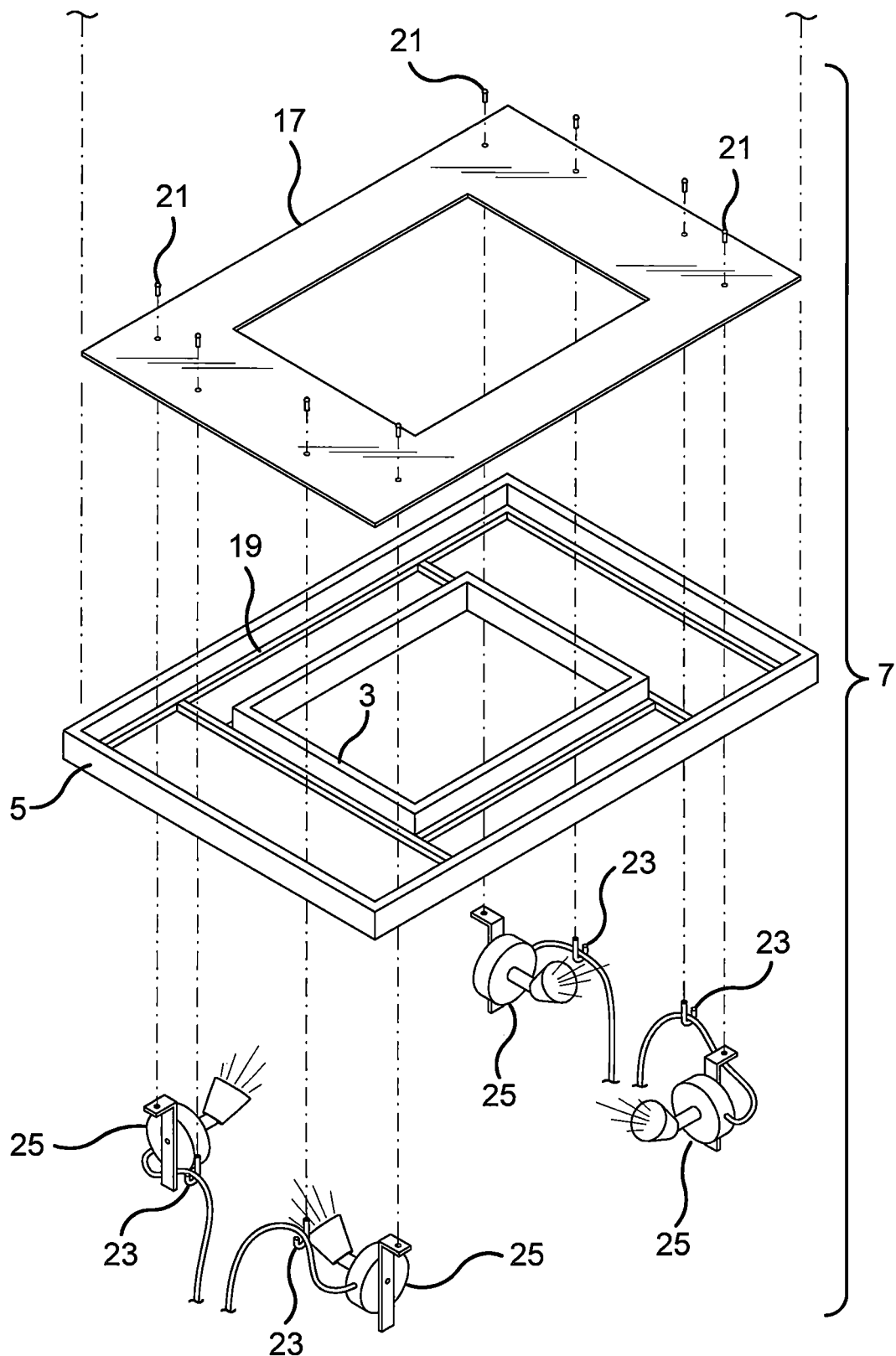
Figure 2:
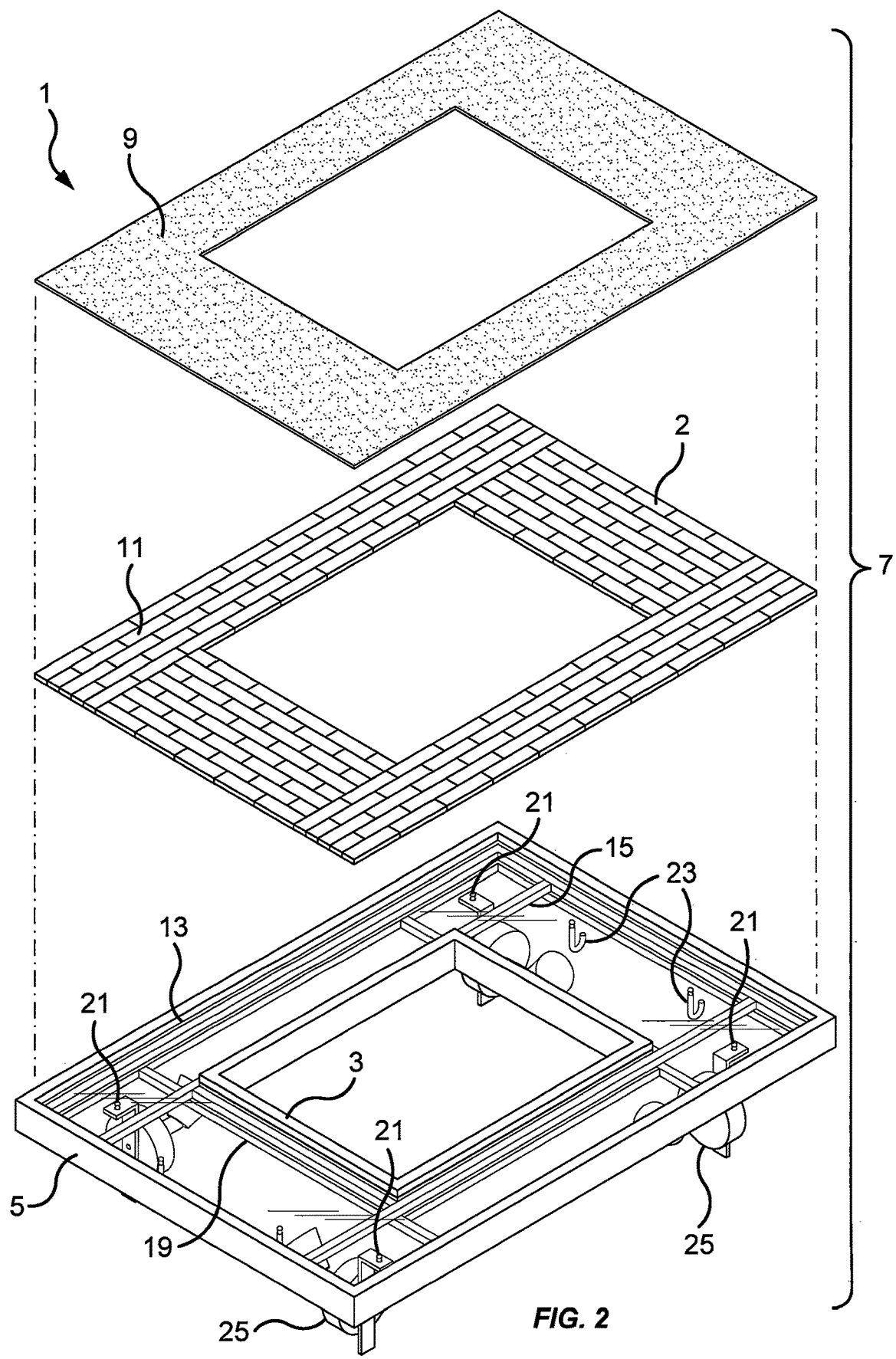
Figure 3:
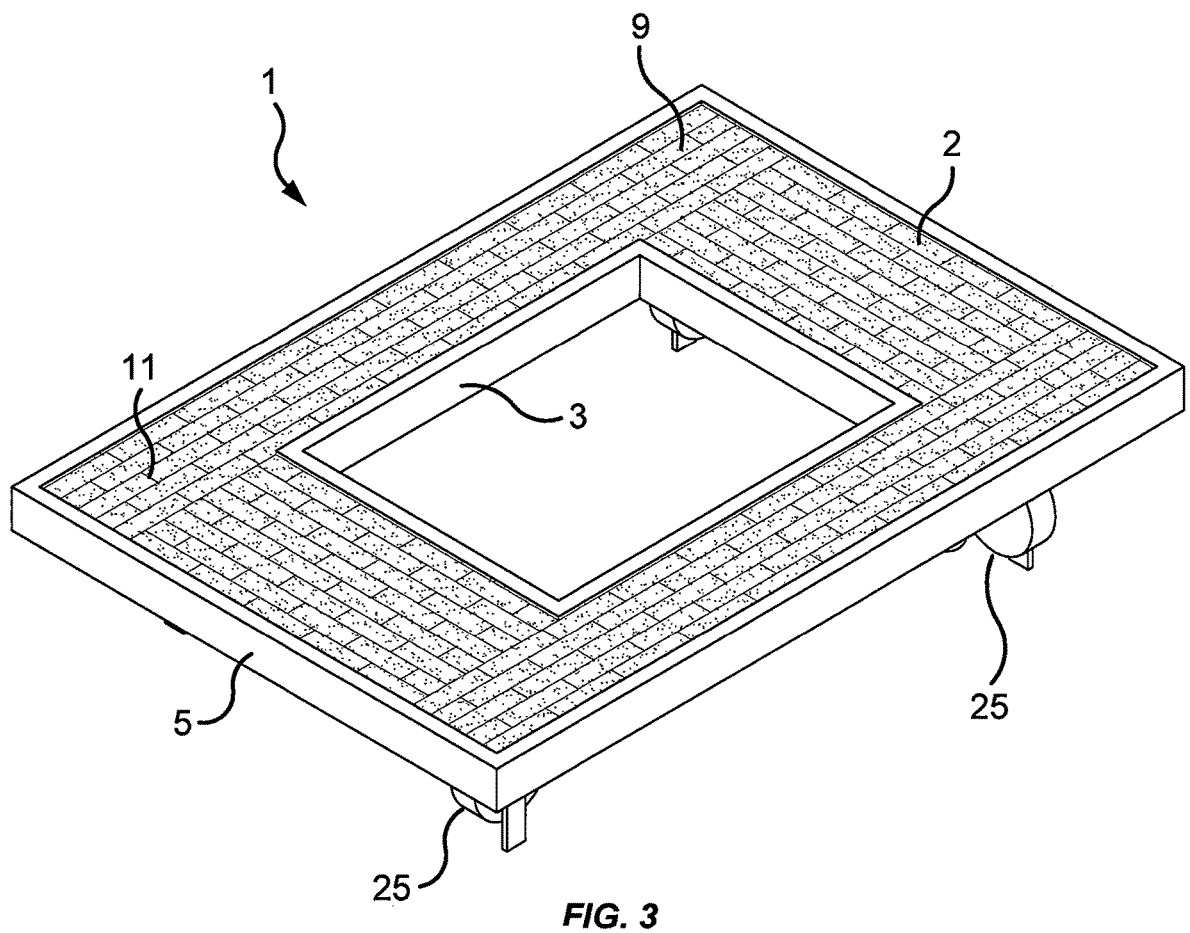

FIGS. 1 to 3 disclose a vanity cabinet 1 with inventive concept components.

FIGS. 1 to 3, disclose specific details of the composite assembly 7 features comprising a plurality of layers, 9, 11, 13, 15, 17, and 19.

FIGS. 1 to 3 disclose the inventive concept attachment fittings 21, 23.

FIGS. 1 to 3, disclose an illuminating light source 25 in the form of LED or equivalent sources.

DETAILED DESCRIPTION OF THE INVENTION NOVEL FEATURES

The basic elements and fundamental purpose of the instant invention is to fill the need for a highly functional low cost and novel means of illuminating cabinet working surface tiled countertops in the following particulars:
  the invention provides for the use of a multiple layer illuminating assembly.
  the invention provides cabinet countertop illumination by means of light transmission through the instant invention illumination assembly for a light source located with in the lower cabinet compartment.
  further the invention can be applied to a plurality of cabinet configurations employing tiled countertop work surfaces.
  in addition the inventive concept can be applied to a plurality of tile materials.
  also the inventive concept can employ a plurality of transparent, translucent epoxy material formats.
  still further the inventive concept can utilize a plurality of light source configurations in both direct and alternating current power sources.

In a still further feature of the instant invention the outer PVC supporting frame 3 is typically sized from ¾ and 2 inch standard material stock, that fits in a standard vanity base with approximately a 1 inch overhang on the sides and a 1 and ⅛ inch overhang on the front face that would constitute 37 inch by 26 inch outside measurements.

The inner PVC supporting frame 5 is sized to hold the perimeter of a drop in sink of any shape and size, and for the sink frame to rest on the periphery of the frame.

The inventive concept disclosed herein can also accommodate sink configurations that incorporates the sink not being recessed but standing independently on the upper surface of the multi-layered composite assembly 7.

The disclosed inventive concept incorporates the top and bottom aluminum supporting frame layers 15 and 19 to be provided typically in aluminum standard tubing sizes of 0.5×0.5 inch material for top frame 15, and 1.0×0.5 inch material from the bottom frame 19 and attachment means will be by standard electric arc welding and similar welding means.

The instant invention further discloses that glass translucent layer 11, and the plexi-glass layers 13, 17, are pre-cut to size to fit with the aluminum supporting frame layers 15 and 19.

It should be noted that the instant invention accommodates a variety of materials for the disclosed components, including alternative translucent polyurethane or plastic paint products for layer 9, alternative materials to PVC in the form of wood, fiber glass for supporting frames items 3 and 5 in the form of wood, fiber glass, alternative translucent materials including plastic products including lexan, acrylic, polycarbonate and thermoplastic polymer materials for layers 11, 13, 17, and metallic, fiber glass, and reinforced plastic materials for layers 15, 19.

Further, the instant invention also discloses alternative light sources 25, in the form of incandescent light, liquid crystal display (LCD). In addition the power supply to light source 25 can be provided by ac., dc . . . or electric power sources, and an integral stand alone dc. battery system in the form of lead-acid, and lithium type stand alone batteries.

In a further embodiment of the instant invention, a vanity cabinet in the form of a free standing sink configuration supported on the upper level 19 of the multilayered assembly 7, can be readily accommodated in the inventive concept disclosed herein.

While the instant invention has been described with reference to exemplary embodiments, it is to be understood that the inventive concept is not limited to the disclosed exemplary embodiments. It should be noted that the instant inventive concept can be applied to other cabinet applications, including but not limited to for example, jewelry display cabinets. The scope of the following claims is to be accorded the broadest interpretations so as to encompass all such modifications and equivalent structures and functions.

I claim:

1. An apparatus to provide the means of effectively illuminating vanity cabinet working countertops, comprising:
  a) a composite multiple layer assembly comprising multiple layers that fits within the vanity cabinet, and composite multilayer assembly wherein the composite multilayer assembly comprises six layers consisting of a) translucent epoxy resin layer, b) translucent glass tile layer, c) upper translucent plexi-glass layer, d) a top frame layer made from aluminum, e) lower translucent plexi-glass layer, and f) lower frame layer made from aluminum; and
  b) a light source beneath the multiple layer assembly that facilitates light transmission through the multiple layer assembly to illuminate the vanity cabinet working counter top.

2. The light source according to claim 1, wherein the light source is in the form of a LED (light emitting diode) source powered by an ac. electric power supply.

3. The light source according to claim 1, wherein the light source is in the form of a LED (light emitting diode) source powered by a dc. stand alone battery electric power supply.

4. The light source according to claim 1, wherein the light source is an incandescent source powered by an ac. electric power supply.

5. The light source according to claim 1, wherein the light source is an incandescent source powered by a dc.stand alone battery electric power supply.

6. A method to provide the means of effectively illuminating vanity cabinet working countertops, comprising:
  a) a composite multiple layer assembly comprising multiple layers that fits within the vanity cabinet; and the composite multilayer assembly wherein the composite multilayer assembly comprises six layers consisting of a) translucent polyurethane resin layer, b) translucent lexan tile layer, c) upper translucent plexi-glass layer, d) a top frame layer made from aluminum, e) lower translucent plexi-glass layer, and f) lower frame layer made from aluminum, and b) a light source beneath the multiple layer assembly that facilitates light transmission through the multiple layer assembly to illuminate the vanity cabinet working counter top.

7. The light source according to claim 6, wherein the light source is in the form of a LED (light emitting diode) source powered by an ac. electric power supply.

8. The light source according to claim 6, wherein the light source is in the form of a LED (light emitting diode) source powered by a dc. stand alone battery electric power supply.

9. The light source according to claim 6, wherein the light source is an incandescent source powered by an ac. electric power supply.

10. The light source according to claim 6, wherein the light source is an incandescent source powered by a dc.stand alone battery electric power supply.

11. A system to provide the means of effectively illuminating vanity cabinet working countertops, comprising:

c) a composite multiple layer assembly comprising multiple layers that fits within the vanity cabinet; and the composite multilayer assembly comprises six layers consisting of a) epoxy resin layer, b) translucent glass tile layer, c) upper plexi-glass layer, d) a top frame layer made from aluminum, e) lower plexi-glass layer, and f) lower frame layer made from aluminum, and, d) a light source beneath the multiple layer assembly that facilitates light transmission through the multiple layer assembly to illuminate the vanity cabinet working counter top.

12. The light source according to claim 11, wherein the light source is in the form of a LED (light emitting diode) source powered by an ac. electric power supply.

13. The light source according to claim 11, wherein the light source is in the form of a LED (light emitting diode) source powered by an dc. stand alone battery electric power supply.

14. The light source according to claim 11, wherein the light source is an incandescent source powered by an ac. electric power supply.

15. The light source according to claim 11, wherein the light source is an incandescent source powered by a dc.stand alone battery electric power supply.

\* \* \* \* \*